A. I. & G. W. DOERR & F. J. MURRAY.
BAKE PAN.
APPLICATION FILED AUG. 30, 1915.
1,205,522.
Patented Nov. 21, 1916.
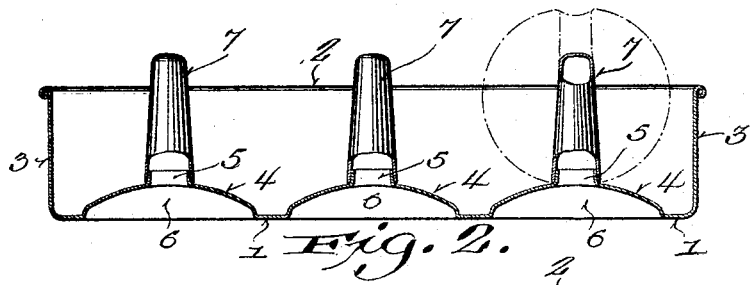
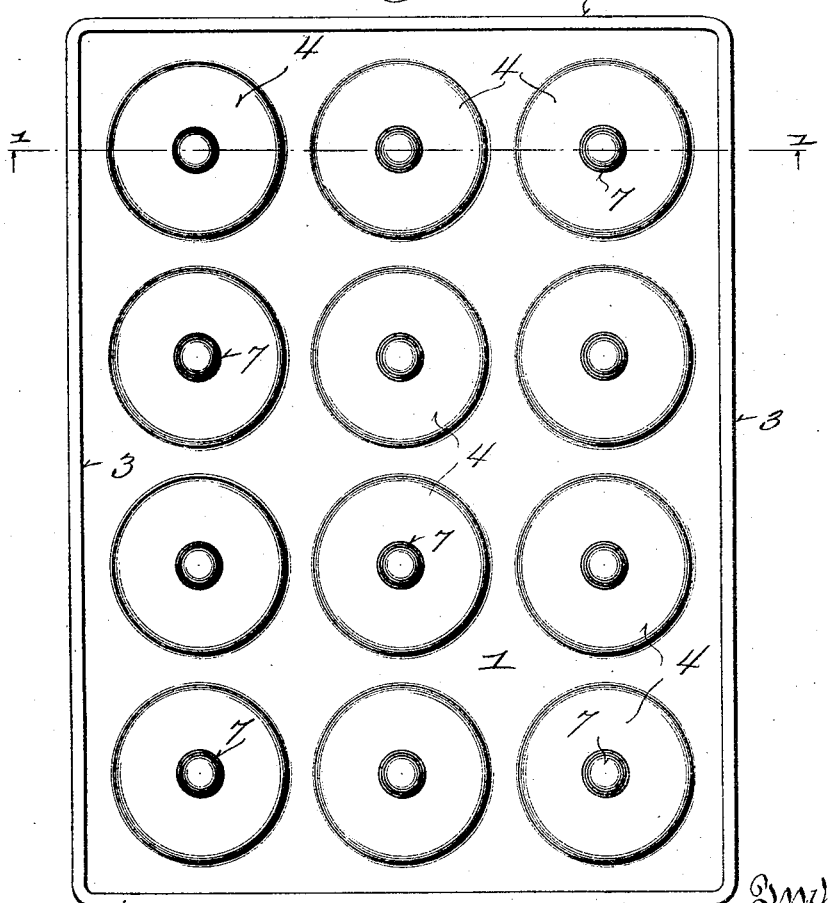

UNITED STATES PATENT OFFICE.

ALBERT I. DOERR, OF ERIE, PENNSYLVANIA, AND GEORGE W. DOERR AND FRANCISCO J. MURRAY, OF MILWAUKEE, WISCONSIN.

BAKE-PAN.

1,205,522.  Specification of Letters Patent.  Patented Nov. 21, 1916.

Application filed August 30, 1915. Serial No. 47,934.

*To all whom it may concern:*

Be it known that we, ALBERT I. DOERR, GEORGE W. DOERR, and FRANCISCO J. MURRAY, all citizens of the United States, and said ALBERT I. DOERR being a resident of Erie, in the county of Erie and State of Pennsylvania, and said GEORGE W. DOERR and FRANCISCO J. MURRAY, being residents of Milwaukee, in the county of Milwaukee and State of Wisconsin, have invented certain new and useful Improvements in Bake-Pans; and we do hereby declare that the following is a full, clear, and exact description thereof.

This invention relates to the subject of bake pans, and has specially in view a novel type of bake pan that is especially adapted for baking apples and the like.

The invention contemplates providing a bake pan with novel means for holding a plurality of apples or the like in spaced relation so that they will be thoroughly baked without danger of the apples being burned, means being provided whereby the juices from the apples are conducted away from the apples so that in the event of the juices boiling they will not damage the apples being baked.

One simple and thoroughly practical embodiment of the improved bake pan is shown in the accompanying drawings, wherein—

Figure 1 is a transverse sectional view of the bake pan, the section being taken on the line 1—1, Fig. 2. Fig. 2 is a top plan view.

The improved bake pan comprises in its general organization a bottom 1 that is surrounded by the upstanding end and side walls 2 and 3, respectively. The bottom of the pan is provided with a plurality of rows of regularly spaced upstanding supports 4 that are preferably rounded, said supports being provided with centrally located upstanding open-ended tubular necks 5. As suggested in Fig. 1 of the accompanying drawings, the supports 4 and necks 5 may be formed by pressing or otherwise treating the bottom 1, although it will be understood that such parts may be otherwise formed. The type of supports 4 present a convexed upper surface and a concaved lower surface, the concaved surfaces forming air chambers 6 that communicate with the necks 5. Core holders 7 preferably tubular and tapering longitudinally, are closed at their upper ends and open at their lower ends, said lower ends being adapted for telescopic engagement with the necks 5.

In use, the cored apples are slipped onto the holders 7, as indicated by dotted lines in Fig. 1, and the pan placed on a stove. The chambers 6 together with the necks 5, and hollow holders 7 form air pockets that temper the heat imparted to the supports and holders so that the apples will not be burned, and the convexed upper surfaces of the supports will conduct the juices away from the apples.

It will be understood from the foregoing description that the improved bake pan is one that may be quickly and economically manufactured, and that as the holders 7 are removable, the entire pan may be readily and quickly cleaned.

What we claim as our invention is:—

A pan for baking apples or other fruit, having a fluid tight connection between its wall and bottom, upwardly struck convex supports on its bottom whereby juice receiving gutters are formed between the supports, said supports being provided with central apertures and upstanding hollow fruit holders disposed over said apertures.

In testimony that we claim the foregoing we have hereunto set our hands at Erie, in the county of Erie and State of Pennsylvania, and at Milwaukee in the county of Milwaukee and State of Wisconsin, respectively.

ALBERT I. DOERR.
GEORGE W. DOERR.
F. J. MURRAY.

Witnesses:
 CHAS. M. SCANLAN,
 HELEN KIELBLOCK.